United States Patent Office
3,828,094
Patented Aug. 6, 1974

3,828,094
SUBSTITUTED UREIDOPHENYLGUANIDINES
Arno Widdig, Blecher, Engelbert Kuhle, Bergisch Gladbach, Ferdinand Grewe, Burscheid, and Helmut Kaspers, Hans Scheinpflug, and Paul-Ernst Frohberger, Leverkusen, Germany, assignors to Bayer Aktiengesellschaft
No Drawing. Filed Oct. 22, 1970, Ser. No. 83,147
Claims priority, application Germany, Nov. 6, 1969,
P 19 55 750.7
Int. Cl. C07c 125/06
U.S. Cl. 260—471 C          11 Claims

ABSTRACT OF THE DISCLOSURE

Substituted ureidophenylguanidines of the formula

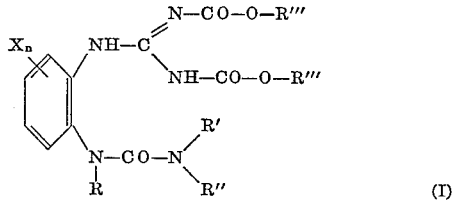

in which

X stands for halogen, lower alkyl or lower alkoxy,
$n$ stands for 0, 1 or 2,
R and R' stand for hydrogen or lower alkyl,
R" stands for hydrogen, cycloalkyl, alkylsulfonyl with up to 18 carbon atoms, di-lower alkylamino, or optionally substituted alkyl with up to 18 carbon atoms, aralkyl, phenyl, acyl with up to 18 carbon atoms, aroyl or arylsulfonyl, or
R' and R" jointly with the connecting nitrogen atom stand for a heterocyclic ring with 4 to 7 ring carbon atoms, the ring possibly containing oxygen or sulfur as further hetero atoms, and
R''' stands for alkyl with up to 12 carbon atoms, which possess fungicidal properties.

The present invention relates to the provision of particular new substituted ureidophenylguanidines which possess fungicidal properties, active compositions in the form of mixtures of such compounds with solid and liquid dispersible carrier vehicles, and methods for producing such compounds and for using such compounds in a new way especially for combating fungi, with other and further objects becoming apparent from a study of the within specification and accompanying examples.

It is generally known that guanidine derivatives can be used as fungicides; an example is dodecylguanidine acetate (cf. Belgian Patent Specification 568,612) which in practice, has attained considerable importance. With the salts of dodecylguanidine, a class of substances has become known which can be used in the curative combating of many fungal diseases, and which can replace the mammal-toxic salts of phenylmercury used hitherto in pip fruit cultivation for the control of scab (*Venturia inaequalis* and *Venturia pirina*). However, the salts of dodecylguanidine are only very slightly effective against powdery mildew fungi from the Family of the *Erysiphaceae*, such as the causative organism of powdery mildew of apples, *Podosphaera leucotricha*.

The present invention provides ureidophenylguanidines of the general formula

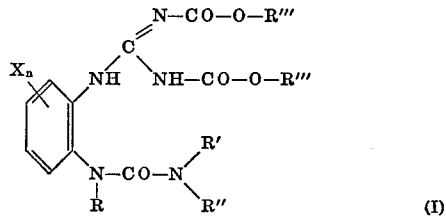

in which

X stands for halogen, lower alkyl or lower alkoxy,
$n$ stands for 0, 1 or 2,
R and R' stand for hydrogen or lower alkyl,
R" stands for hydrogen, for alkyl with 1 to 18 carbon atoms, optionally substituted by halogen, cyano, lower alkoxy and/or lower alkoxy-carbonyl, for cycloalkyl with 5 to 8 ring carbon atoms, for aralkyl optionally substituted in the aryl moiety by halogen, lower alkyl and/or lower alkoxy, for phenyl optionally substituted by halogen, lower alkyl and/or lower alkoxy, for acyl with up to 18 carbon atoms optionally substituted by halogen and/or lower alkoxy, for aroyl optionally substituted by halogen, lower alkyl and/or lower alkoxy, for alkylsulfonyl with up to 18 carbon atoms, for arylsulfonyl optionally substituted by halogen, amino, lower alkyl and/or lower alkoxy, or for di-lower alkylamino, or
R' and R" jointly with the connecting nitrogen atom stand for a heterocyclic ring with 4 to 7 ring carbon atoms, the ring possibly containing oxygen or sulfur as further hetero atoms, and
R''' stands for alkyl with up to 12 carbon atoms, which compounds exhibit strong fungicidal properties.

The invention also provides a process for the production of an ureidophenylguanidine of the formula (I) in which a 2-ureidoaniline derivative of the formula

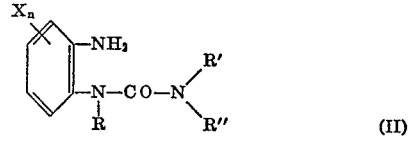

in which X, $n$, R, R' and R" are the same as defined above, is reacted with a N,N'-bis-carboalkoxyisothiourea-S-alkyl ether of the formula

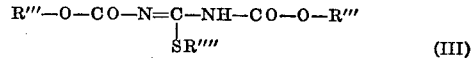

in which

R''' is the same as defined above, and
R'''' stands for lower alkyl, in the presence of a diluent.

It is very surprising that the ureidophenylguanidines according to the invention possess a higher fungicidal activity against powdery mildew fungi than the above-mentioned dodecylguanidine acetate. It is also interesting that compounds according to the invention also exhibit a genuine systemic effectiveness against some important fungus-parasitic diseases. Thus it is possible, by supplying the substances via the roots of the host plants, to protect cucumbers from powdery mildew of cucumber (*Erysiphe cichoracearum*), apples from apple scab (*Venturia inaequalis*) and powdery mildew of apples (*Podosphaera leucotricha*), and horse beans (*Vicia faba*) from *Botrytis cinerea*. The prior art agents mentioned above do not possess such a systemic activity. Because of their protective, curative and systemic fungicidal activity against a large number of phytopathogenic fungi from various systematic groups, and their high plant compatibility and low toxicity to warm-blooded animals, the compounds according to the invention represent a valuable enrichment of the art.

When N-2-aminophenyl-N'-n-butylurea and N,N'-bis-carbomethoxyisothiourea-S-methyl ether are used as starting materials, the reaction course can be represented by the following formula scheme:

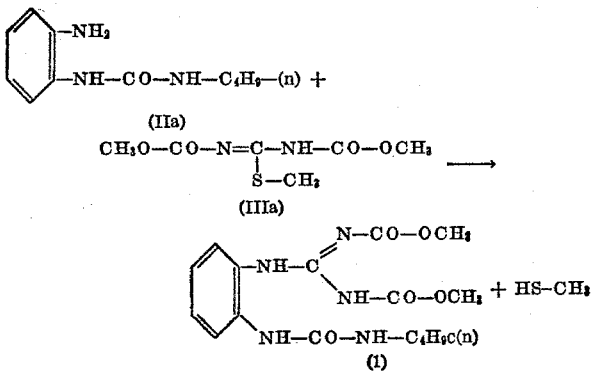

The 2-ureidoaniline derivatives used as starting products are defined by the formula (II).

X stands preferably for chlorine, bromine, fluorine, alkyl of 1 to 4 carbon atoms and especially methyl, ethyl, isopropyl, alkoxy of 1 to 4 carbon atoms and especially methoxy, ethoxy or isopropoxy, $n$ stands preferably for 0 or 1, R and R' stand preferably for hydrogen, or alkyl of 1 to 4 carbon atoms and especially methyl or ethyl, and R" stands preferably for hydrogen, alkyl with up to 12 carbon atoms, benzyl, phenyl, p-tolyl, p-methoxyphenyl, methoxyethyl, ethoxypropyl, cyanopentyl, acetyl, benzoyl, methanesulfonyl, p-toluenesulfonyl, or dimethylamino, or R' and R" together stand preferably for tetramethylene or pentamethylene.

As examples of the 2-ureidoaniline derivatives, there may be mentioned 2-amino-phenylurea,
N-2-aminophenyl-N'-methylurea,
N-2-aminophenyl-N',N'-dimethylurea,
N-2-aminophenyl-N'butylurea,
N-2-aminophenyl-N'-octylurea,
N-2-aminophenyl-N'-dodecylurea,
N-2-aminophenyl-N'-ω-cyanopentylurea,
N-2-aminophenyl-N'-2-methoxy-ethylurea,
N-2-aminophenyl-N'-benzylurea,
N-2-aminophenyl-N'-phenylurea,
N-2-aminophenyl-N',N'-tetramethyleneurea,
N-2-aminophenyl-N'-acetylurea,
N-2-aminophenyl-N'-benzoylurea,
N-2-aminophenyl-N'-p-toluene-sulfonylurea,
4-(2-aminophenyl)-1,1-dimethylsemicarbazide,
N-2-aminophenyl-N-methyl-N'-butylurea,
N-2-amino-phenyl-N-ethyl-N'-butylurea,
N-2-aminophenyl-N-methyl-N'-dodecylurea,
N-(2-amino-4-chlorophenyl)-N'-butylurea, and
N-(2-amino-4-ethoxyphenyl)-N'-butylurea.

The 2-ureidoanilines used as starting products are largely known (cf. Beilstein's Handbuch der organischen Chemie, volume *13*, pages 20–32, Berlin 1930; volume *13*, "1 Ergänzungswerk" (1st Supplement) pages 8–10, Berlin 1933; volume *13*, "2 Ergänzungswerk" (2nd Supplement), pages 14–23, Berlin-Göttingen-Heidelberg 1950). They can also be obtained by reduction or catalytic hydrogenation of the appropriate nitro compounds.

The isothiourea ethers used as starting materials are clearly defined by the formula (III).

R'" stands preferably for alkyl of 1 to 4 carbon atoms and especially methyl, ethyl or propyl.

R"" stands preferably for alkyl of 1 to 4 carbon atoms, and especially methyl or ethyl.

Some of the isothiourea ethers are known (cf. Olin and Dains, J. Amer. Chem. Soc. *52*, 3326 (1930) and U.S. Pat. 2,933,502); they can also be obtained from S-alkylisothiourea ethers and chloroformic acid alkyl esters in the presence of equivalent amounts of alkali.

As examples of the isothiourea ethers, there may be mentioned:

N,N'-bis-carbomethoxy-isothiourea-S-methyl ether,
N,N'-bis-carbomethoxy-isothiourea-S-ethyl ether,
N,N'-bis-carboethoxy-isothiourea-S-methyl ether, and
N,N'-bis-carbopropoxy-isothioruea-S-methyl ether.

The diluent used in the process of the invention may for example be any polar organic solvent. Such solvents include preferably alcohols, such as methanol, ethanol and isopropanol, as well as mixtures thereof with water; ketones, such as acetone (which may be mixed with water); and also ethers, such as dioxan or tetrahydrofuran.

The reaction temperatures can be varied within a fairly wide range. In general, the reaction is carried out at between about 50 to 120° C., preferably about 60 to 100° C.

When carrying out the process according to the invention, 1 mole of isothiourea ether is generally used for each mole of 2-ureidoaniline derivative. Amounts greater or less by up to 20% are possible without substantial diminution of yield. The reaction is preferably carried out in boiling solvent, alkylmercaptan being formed as by-product. The end products are obtained in crystalline form when the reaction mixture is cooled, and can be separated by suction filtration and, optionally, purified by re-dissolving or recrystallization.

The active compounds according to the invention exhibit a strong fungicidal activity. In the concentrations necessary for the control of fungi, they do not appear to damage cultivated plants, and have a low toxicity to warm-blooded animals. For these reasons, they are suitable for use as crop protection agents for the control of fungi. Fungitoxic agents in crop protection are used for the control of *Archimycetes, Phycomycetes Ascomycetes, Basidiomycetes* and *Fungi Imperfecti*.

The active compounds according to the invention have a broad activity spectrum and can be applied against parasitic fungi which infect above-the-soil parts of plants or attack the plants from the soil, as well as against seed-borne pathogenic agents.

In comparison with the above-mentioned agents of the prior art, they are substantially more effective against fungi which cause powdery mildew diseases. To this group of fungi there belong predominantly representatives from the Family of the *Erysiphaceae* with the most important genera *Erysiphe, Uncinula (Oidium), Sphaerotheca, Podosphaera*. As important fungi, there are mentioned in particular: *Erysiphe cichoracearum, Podosphaera leucotricha* and *Uncinula necator*.

The active compounds according to the invention also give good results in the control of rice diseases. Thus, they show an excellent activity against the fungi *Piricularia oryzae* and *Pellicularia sasakii*, by reason of which they can be used for the joint control of the diseases caused by these two fungi. That means a substantial advance, since agents of different chemical constitution have hitherto generally been required against these two fungi. Surprisingly, the present active compounds show not only a protective activity, but also a curative and systemic effect.

The compounds according to the invention, however, also act against other fungi which infect rice or other cultivated plants, for example *Cochliobolus myiabeanus, Mycosphaerella musicola, Cerospora personata, Botrytis cinerea, Alternaria* species, *Verticillium alboatrum, Phialophora cinerescens* and *Fusarium* species as well as against the bacterium *Xanthomonas oryzae.*

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.) alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides, or herbicides, insecticides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95%, and preferably 2.0–90%, by weight of the mixture, whereas carrier composition mixtures suitable for direct application or field application generally contemplate those in which the active compound is present in an amount substantially between about 0.0001–10%, preferably 0.01–1.0%, by weight of the mixture. Thus, the present invention contemplates over-all compositions which comprise mixtures of a conventional dispersible carrier vehicle such as (1) a dispersible carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally about 0.0001–95%, and preferably 0.01–95%, by weight of the mixture.

Generally, 0.0001–10% by weight concentrations of the active compound are sufficiently effective, although aqueous preparations having concentrations of 0.01–1.0% by weight of the active compound are normally used.

In the case of use as seed dressings, amounts of 0.1 to 10 g., preferably 0.2 to 2 g., of active compound per kg. of seed are generally suitable.

In the case of use as soil treatment agents, amounts of 1 to 500 g., preferably 10 to 200 g., per cubic meter of soil are generally necessary.

The active compound can also be used in accordance with the well-known ultra-low-volume process with good success, i.e. by applying such compound if normally a liquid, or by applying a liquid composition containing the same, via every effective atomizing equipment, in finely divided form, e.g. average particle diameter of from 50–100 microns, or even less, i.e. mist form, for example, by airplane crop spraying techniques. Only up to at most about a few liters/hectare are needed, and often amounts only up to about 1 quart/acre, preferably 2–16 fluid ounces/acre, are sufficient. In this process, it is possible to use highly concentrated liquid compositions with said liquid carrier vehicles containing from about 20 to about 80 or 95% by weight of the active compound, or even the 100% active substance alone, e.g. about 20–100% by weight of the active compound.

In particular, the present invention contemplates methods of selectively killing, combating or controlling fungi, which comprises applying to at least one of (a) such fungi and (b) their habitat, i.e. the locus to be protected, a fungicidally effective or toxic amount of the particular active compound of the invention alone or together with a carrier vehicle as noted above. The instant formulations or compositions are applied in the usual manner, for instance, by squirting, spraying, atomizing, vaporizing, scattering, fumigation, dusting, watering, sprinkling, pouring, dressing or incrustation and the like.

The active compounds according to the invention also show insecticidal and acaricidal activity as well as activity against some mold fungi and yeasts. If applied in amounts significantly greater than the fungicidally necessary concentrations, the substances inhibit plant growth.

It will be realized, of course, that the concentration of the particular active compound utilized in admixture with the carrier vehicle will depend upon the intended application. Therefore, in special cases, it is possible to go above or below the aforementioned concentration ranges.

The fungicidal effectiveness of the new compounds of the present invention is illustrated, without limitation, by the following examples.

EXAMPLE 1

*Fusicladium test* (apple scab) (Protective)

Solvent: 4.7 parts by weight acetone
Emulsifier: 0.3 part by weight alkylaryl polyglycol ether
Water: 95 parts by weight The amount of active compound required for the desired concentration of the active compound in the spray liquid is mixed with the stated amount of solvent, and the concentrate is diluted with the stated amount of water which contains the stated additions.

Young apple seedling in the 4–6 leaf stage are sprayed with the spray liquid until dripping wet. The plants remain in a greenhouse for 24 hours at 20° C. and at a relative atmospheric humidity of 70%. They are then inoculated with an aqueous conidium suspension of the apple scab causative organism (*Fusicladium dendriticum* Fuckel) and incubated for 18 hours in a humidity chamber at 18–20° C. and at a relative atmospheric humidity of 100%.

The plants are then returned to a greenhouse for 14 days.

15 days after inoculation, the infestation of the seedlings is determined as a percentage of the untreated but also inoculated control plants.

0% means no infestation; 100% means that the infestation is exactly as great as in the case of the control plants.

The active compounds, the concentrations of the active compounds and the results obtained can be seen from Table 1.

TABLE 1.—FUSICLADIUM TEST/PROTECTIVE

| Active compound | Infection as a percentage of the infection of the untreated control with a concentration of active compound (in percent) of 0.0062 |
|---|---|
| (A) $C_{12}H_{25}NH-C(=NH)(NH_2) \cdot CH_3COOH$ (known) | 25 |
| (1) 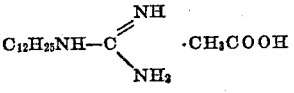 | 17 |

EXAMPLE 2

*Fusicladium test* (apple scab) (Curative)

Solvent: 4.7 parts by weight acetone
Emulsifier: 0.3 part by weight alkylaryl polyglycol ether
Water: 95 parts by weight.

The amount of active compound required for the desired concentration of the active compound in the spray liquid is mixed with the stated amount of solvent, and the concentrate is diluted with the stated amount of water which contains the stated additions.

Young apple seedlings in the 4–6 leaf stage are inoculated with an aqueous conidium suspension of the apple scab causative organism *Fusicladium dendriticum* Fuckel and incubated for 18 hours in a humidity chamber at 18–20° C. and at an atmospheric humidity of 100%. The plants are then placed in a greenhouse where they dry.

After standing for a suitable period of time, the plants, are sprayed dripping wet with the spray liquid prepared in the manner described above. The plants are then returned to a greenhouse.

15 days after inoculation, the infestation of the apple seedlings is determined as a percentage of the untreated but also inoculated control plate.

0% means no infestation; 100% means that the infestation is exactly as great as in the case of the control plants.

The active compounds, the concentrations of the active compounds, the period of time between inoculation and spraying and the results obtained can be seen from Table 2.

TABLE 2.—FUSICLADIUM TEST/CURATIVE

| Active compound | Residence period in hours | Infection as a percentage of the infection of the untreated control with a concentration of active compound (in percent) of— | |
|---|---|---|---|
| | | 0.025 | 0.0060 |
| (A) $C_{12}H_{25}NH-C(=NH)(NH_2) \cdot CH_3COOH$ (known) | 42 | 26 | 4 |
| (1) 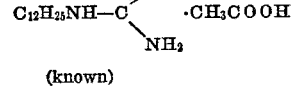 | 42 | 5 | 4 |
| (4) 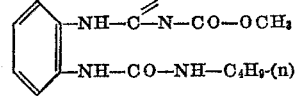 | 42 | 7 | |
| (7) 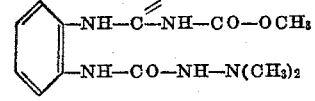 | 42 | 13 | 41 |

EXAMPLE 3

Erysiphe test

Solvent: 4.7 parts by weight acetone
Emulsifier: 0.3 parts by weight alkylaryl polyglycol ether
Water: 95 parts by weight The amount of the active compound required for the desired concentration in the spray liquid is mixed with the stated amount of the solvent, and the concentrate is diluted with the stated amount of water containing the stated additions.

Young cucumber plants (Delikatess variety) with about three foliage leaves are sprayed with the spray liquid until dripping wet. The cucumber plants remain in a greenhouse for 24 hours to dry. They are then, for the purpose of inoculation, dusted with conidia of the fungus *Erysiphe polyphaga*. The plants are subsequently placed in a greenhouse at 23–24° C. and at a relative atmospheric humidity of about 75%.

After 12 days, the infestation of the cucumber plants is determined as a percentage of the untreated but also inocluated control plants. 0% means no infestation; 100% that the infestation is exactly as great as in the case of the control plants.

The active compounds, the concentrations of the active compounds and the results obtained can be seen from Table 3.

TABLE 3.—ERYSIPHE TEST

| Active compound | Infection as a percentage of the infection of the untreated control with a concentration of active compound (in percent) of 0.0062 |
|---|---|
| (A) $C_{12}H_{25}NH-C(=NH)(NH_2) \cdot CH_3COOH$ (known) | 87 |
| (1) phenyl with N=C(–OCH$_3$)–NH, NH–CO–OCH$_3$, and –NH–CO–NH–C$_4$H$_9$-(n) | 80 |
| (6) phenyl with N=C(–OCH$_3$)–NH, NH–CO–OCH$_3$, and –NH–CO–NH–CH$_2$–CH$_2$–O–CH$_3$ | 50 |
| (7) phenyl with N=C(–OCH$_3$)–NH, NH–CO–OCH$_3$, and –NH–CO–NH(CH$_3$)$_2$ | 73 |

EXAMPLE 4

Fusicladium test (systemic)

Solvent: 4.7 parts by weight acetone
Emulsifier: 0.3 parts by weight alkylaryl polyglycol ether
Water: 95 parts by weight The amount of active compound required for the desired concentration of the active compound in the liquid to be used for watering is mixed with the stated amount of solvent, and the concentrate is diluted with the stated amount of water which contains the stated additions.

Apple seedlings grown in standard soil are, in the 3–4 leaf stage, watered once in one week with 20 cc. of the liquid to be used for watering, in the stated concentration of active compound, with reference to 100 cc. of soil. The plants so treated are, after the treatment, inoculated with an aqueous conidium suspension of *Fusicladium dendriticum* Fuckel and incubated for 18 hours in a humidity chamber at 18–20° C. and at a relative atmospheric humidity of 100%. The plants are then returned to a greenhouse for 14 days.

15 days after inoculation, the infection of the seedlings is determined as a percentage of the untreated but also inoculated control plants. 0% means no infection; 100% means that the infection is exactly as great as in the case of the control plants.

The active compounds, the concentrations of the active compounds and the results obtained can be seen from Table 4.

TABLE 4.—FUSICLADIUM TEST/SYSTEMIC

| Active Compound | Infection as a percentage of the infection of the untreated control with a concentration of active compound of— | |
|---|---|---|
| | 30 p.p.m. | 15 p.p.m. |
| (A) $C_{12}H_{25}NH-C(=NH)(NH_2) \cdot CH_3COOH$ | 100 | 100 |
| (1) phenyl with N=C(–OCH$_3$)–NH, NH–CO–OCH$_3$, and –NH–CO–NH–C$_4$H$_9$-(n) | 2 | 47 |
| (2) phenyl with N=C(–OC$_2$H$_5$)–NH, NH–CO–OC$_2$H$_5$, and –NH–CO–NH–C$_4$H$_9$-(n) | 26 | |

TABLE 4—Continued

| Active compound | Infection as a percentage of the infection of the untreated control with a concentration of active compound of— | |
|---|---|---|
| | 30 p.p.m. | 15 p.p.m. |
| (3) phenyl-NH-C(=N-CO-OCH$_3$)-NH-CO-OCH$_3$; -NH-CO-NH-CH$_3$ | 4 | 74 |
| (4) phenyl-NH-C(=N-CO-OCH$_3$)-NH-CO-OCH$_3$; -NH-CO-NH-C$_8$H$_{17}$(n) | 67 | -------- |
| (6) phenyl-NH-C(=N-CO-OCH$_3$)-NH-CO-OCH$_3$; -NH-CO-NH-CH$_2$-CH$_2$-O-CH$_3$ | 0 | 71 |
| (7) phenyl-NH-C(=N-CO-OCH$_3$)-NH-CO-OCH$_3$; -NH-CO-NH-N(CH$_3$)$_2$ | 2 | -------- |

EXAMPLE 5

*Podosphaera test* (systemic)

Solvent: 4.7 parts by weight acetone
Dispersing agent: 0.3 parts by weight alkylaryl polyglycol ether
Water: 95 parts by weight The amount of active compound required for the desired concentration of the active compound in the liquid to be used for watering is mixed with the stated amount of solvent, and the concentrate is diluted with the stated amount of water which contains the stated additions.

Apple seedlings grown in standard soil are, in the 3–4 leaf stage, watered once in one week with 20 cc. of the liquid to be used for watering, in the stated concentration or active compound, with reference to 100 cc. of soil. The plants so treated are, after treatment, inoculated with conidia of *Podosphaera leucotricha* Salm. and placed in a greenhouse at a temperature of 21–23° C. and at a relative atmospheric humidity of about 70%. 10 days after the inoculation, the infection of the seedlings is determined as a percentage of the untreated but also inoculated control plants.

0% means no infection; 100% means that the infection is exactly as great as in the case of the control plants.

The active compounds, the concentrations of the active compounds and the results obtained can be seen from Table 5.

TABLE 5.—PODOSPHAERA TEST/SYSTEMIC

| Active compound | Infection as a percentage of the infection of the untreated control with a concentration of active compound of— | |
|---|---|---|
| | 30 p.p.m. | 15 p.p.m. |
| (A) C$_{12}$H$_{25}$NH-C(=NH)-NH$_2$ · CH$_3$COOH | 100 | 100 |
| (1) phenyl-NH-C(=N-CO-OCH$_3$)-NH-CO-OCH$_3$; -NH-CO-NH-C$_4$H$_9$(n) | 32 | 50 |
| (3) phenyl-NH-C(=N-CO-OCH$_3$)-NH-CO-OCH$_3$; -NH-CO-NH-CH$_3$ | 28 | -------- |

TABLE 5—Continued

| Active component | Infection as a percentage of the infection of the untreated control with a concentration of active compound of— | |
|---|---|---|
| | 30 p.p.m. | 15 p.p.m. |
| (6) [structure: phenyl ring with NH–C(=N–CO–OCH₃)–NH–CO–OCH₃ and NH–CO–NH–CH₂–CH₂–O–CH₃] | 44 | 88 |
| (7) [structure: phenyl ring with NH–C(=N–CO–OCH₃)–NH–CO–OCH₃ and NH–CO–NH–N(CH₃)₂] | 64 | |

EXAMPLE 6

Botrytis test (systemic)

Solvent: 4.7 parts by weight acetone
Dispersing agent: 0.3 parts by weight alkylaryl polyglycol ether
Water: 95 parts by weight.

The amount of active compound required for the desired concentration of the active compound in the liquid to be used for watering is mixed with the stated amount of solvent, and the concentrate is diluted with the stated amount of water which contains the stated additions.

Plants of *Vicia faba* grown in standard soil are, in the 1–2 leaf-pair state, watered once in one week with 20 cc. of the liquid to be used for watering, in the stated concentration of active compound, with reference to 100 cc. of soil.

After the treatment, the lower two leaf-pairs are removed and, in each case, placed in a Petri dish lined with moist filter paper. Small discs of filter paper of 1 cm. diameter are then dipped into an aqueous conidium suspension of the grey mold causative organism, *Botrytis cinerea* Pers. ex Fr and laid on the leaves. After an incubation period of 48 hours in the closed dishes at 20° C., the necroses visible under the small discs are evaluated according to frequency of occurrence (evaluation scheme O–V). The evaluation values obtained are converted into percentage infection.

0% means no infection; 100% means that the infection is exactly as great as in the case of the control plants.

The active compounds, the concentration of the active compounds and the results can be seen from Table 6.

TABLE 6.—BOTRYTIS TEST/SYSTEMIC

| Active compound | Evaluation of leaf necroses O–V with the following concentrations of active compound in p.p.m., 120 |
|---|---|
| (A) C₁₂H₂₅NH–C(=NH)–NH₂ · CH₃COOH | 100 |
| (6) [structure: phenyl ring with NH–C(=N–CO–OCH₃)–NH–CO–OCH₃ and NH–CO–NH–CH₂–CH₂–O–CH₃] | 75 |

EXAMPLE 7

Piricularia and Pellicularia test

Solvent: 4 parts by weight acetone
Dispersing agent: 0.05 parts by weight sodium oleate
Water: 95.75 parts by weight
Other additives: 0.2 parts by weight gelatin The amount of active compound required for the desired concentration of active compound in the spray liquor is mixed with the stated amount of solvent, and the concentrate is diluted with the stated amount of water containing the stated additives.

2 batches each consisting of 30 rice plants about 2–4 weeks old are sprayed with the spray liquor until dripping wet. The plants remain in a greenhouse at temperatures of 22 to 24° C. and a relative atmospheric humidity of about 70% until they are dry. One batch of the plants is then inoculated with an aqueous suspension of 100,000 to 200,000 spores/ml. of *Piricularia oryzae* and placed in a chamber at 24–26° C. and 100% relative atmospheric humidity. The other batch of the plants is infected with a culture of *Pellicularia sasakii* grown on malt agar and placed at 28–30° C. and 100% relative atmospheric humidity.

5 to 8 days after inoculation, the infection of all the leaves present at the time of inoculation with *Piricularia oryzae* is determined as a percentage of the untreated but also inoculated control plants. In the case of the plants infected with *Pellicularia sasakii*, the infection on the leaf sheaths after the same time is also determined in proportion to the untreated but infected control.

0% means no infection; 100% means that the infection is exactly as great in the case of the control plants.

The active compounds, the concentrations of the active compounds and the results can be seen from Table 7.

TABLE 7.—PIRICULARIA (a) AND PELLICULARIA (b) TEST
[Pr.=Protective    Cur.=Curative]

| Active compound | | Infection as a percentage of the infection of the untreated control with a concentration of active compound (in percent) of— | | | |
|---|---|---|---|---|---|
| | | (a) | | (b) | |
| | | 0.05 | 0.025 | 0.05 | 0.025 |
| (B) $C_{12}H_{25}$—NH—C(=NH)—$NH_2$·$CH_3COOH$ (known) | Pr. | 100 | 100 | 100 | |
| | Cur. | 100 | | | |
| (1) phenyl—NH—C(=N—CO—$OCH_3$)—NH—CO—$OCH_3$; —NH—CO—NH—$C_4H_9$—(n) | Pr. | 0 | 0 | | |
| | Cur. | 0 | 25 | | |
| (2) phenyl—NH—C(=N—CO—$OC_2H_5$)—NH—CO—$OC_2H_5$; —NH—CO—NH—$C_4H_9$ | Pr. | 0 | 0 | 0 | |
| | Cur. | 0 | 75 | | |
| (3) phenyl—NH—C(=N—CO—$OCH_3$)—NH—CO—$OCH_3$; —NH—CO—NH—$CH_3$ | Pr. | 0 | 8 | 50 | |
| (4) phenyl—NH—C(=N—CO—$OCH_3$)—NH—CO—$OCH_3$; —NH—CO—NH—$C_8H_{17}$-(n) | Pr. | 0 | | | |
| (8) phenyl—NH—C(=N—CO—$OCH_3$)—NH—CO—$OCH_3$; —NH—CO—NH—$C_{12}H_{25}$-(n) | Pr. | 0 | 17 | | |
| (6) phenyl—NH—C(=N—CO—$OCH_3$)—NH—CO—$OCH_3$; —NH—CO—NH—$CH_2$—$CH_2$—O—$CH_3$ | Pr. | 0 | 0 | 0 | |
| | Cur. | | | | |
| (7) phenyl—NH—C(=N—CO—$OCH_3$)—NH—CO—$OCH_3$; —NH—CO—NH—N($CH_3$)$_2$ | Pr. | 0 | 0 | 25 | |
| | Cur. | 0 | 13 | | |

EXAMPLE 8

Agar plate test

Test for fungitoxic effectiveness and breadth of the activity spectrum.

Solvent: acetone
Parts by weight:
(a) 1000
(b) 100

To produce a suitable preparation of the active compound, 1 part by weight of the active compound is taken up in the stated amount of solvent.

The preparation of the active compound is added to potato dextrose agar (which has been liquefied by heating in such an amount that the desired concentration of active compound is set up therein. After thorough shaking to achieve a uniform dispersion of the active compound, the agar is poured into Petri dishes under sterile conditions. When the mixture of substrate and active compound has solidified, test fungi from pure cultures are inoculated on to it in small discs of 5 mm. diameter. The Petri dishes remain at 20° C. for 3 days for incubation.

After this time, the inhibiting action of the active compound on the mycelium growth is determined in categories, taking into account the untreated control. 0 means no mycelium growth, either on the treated substrate or on the inoculum, the symbol—means mycelium growth on the inoculum only with no spread to the treated substrate; and the symbol+means mycelium growth from the inoculum on the treated substrate, similar to the spread to the untreated substrate of the control.

The active compounds, the concentration of the active compounds, the test fungi and the inhibition effects achieved can be seen from Table 8.

TABLE 8.—AGAR PLATE TEST

| Active compound | Concentration of active compound in the substrate in p.p.m. | Corticium rolfsii | Sclerotinia sclerotiorum | Verticillium albo-atrum | Thielaviopsis basicola | Phytophthora cactorum | Fusarium culmorum | Fusarium oxysporum | Fusarium solani f. pisi |
|---|---|---|---|---|---|---|---|---|---|
| Untreated | — | + | + | + | + | + | + | + | + |
| (C) $CH_2-NH-CS-S$ \ $Zn$ / $CH_2-NH-CS-S$ (known) | 10<br>100 | +<br>+ | +<br>+ | +<br>+ | +<br>0 | | +<br>+ | +<br>+ | +<br>+ |
| (1) Phenyl-NH-C(=N-CO-OCH₃)(NH-CO-OCH₃), NH-CO-NH-C₄H₉-(n) | 10<br>100 | +<br>0 | 0<br>0 | −<br>− | 0<br>0 | −<br>0 | −<br>0 | 0<br>0 | +<br>0 |
| (2) Phenyl-NH-C(=N-CO-OC₂H₅)(NH-CO-OC₂H₅), NH-CO-NH-C₄H₉-(n) | 10<br>100 | +<br>0 | 0<br>0 | ±<br>± | 0<br>0 | +<br>0 | 0<br>0 | 0<br>0 | +<br>0 |
| (3) Phenyl-NH-C(=N-CO-OCH₃)(NH-CO-OCH₃), NH-CO-NH-CH₃ | 10<br>100 | +<br>0 | 0<br>0 | −<br>− | 0<br>0 | +<br>0 | −<br>0 | 0<br>0 | ±<br>± |
| (4) Phenyl-NH-C(=N-CO-OCH₃)(NH-CO-OCH₃), NH-CO-NH-C₈H₁₇-(n) | 10<br>100 | ±<br>± | 0<br>0 | ±<br>± | −<br>0 | ±<br>± | ±<br>0 | ±<br>0 | ±<br>± |
| (8) Phenyl-NH-C(=N-CO-OCH₃)(NH-CO-OCH₃), NH-CO-NH-C₁₂H₂₅-(n) | 10<br>100 | ±<br>± | 0<br>0 | ±<br>± | −<br>0 | ±<br>± | ±<br>0 | ±<br>0 | ±<br>± |
| (6) Phenyl-NH-C(=N-CO-OCH₃)(NH-CO-OCH₃), NH-CO-NH-CH₂-CH₂-O-CH₃ | 10<br>100 | +<br>0 | 0<br>0 | ±<br>± | 0<br>0 | ±<br>0 | 0<br>0 | 0<br>0 | ±<br>± |
| (7) Phenyl-NH-C(=N-CO-OCH₃)(NH-CO-OCH₃), NH-CO-NH-N(CH₃)₂ | 10<br>100 | +<br>± | 0<br>0 | ±<br>± | 0<br>0 | ±<br>± | ±<br>0 | ±<br>0 | ±<br>± |
| (5) Phenyl-NH-C(=N-CO-OCH₃)(NH-CO-OCH₃), NH-CO-NH-CH₂-Phenyl | 10<br>100 | +<br>± | 0<br>0 | ±<br>± | 0<br>0 | 0<br>0 | ±<br>0 | +<br>0 | ±<br>± |

EXAMPLE 9

Seed-dressing test/bunt of wheat (seed-born mycosis)

To produce a suitable dry dressing, the active compound is extended with a mixture of equal parts by weight of talc and kieselguhr to give a finely powdered mixture with the desired concentration of the active compound.

Wheat seed is contaminated with 5 g. of the chlamydospores of *Tilletia* caries per kg. of seed. To apply the dressing, the seed is shaken with the dressing in a closed glass flask. The seed, on moist loam under a cover of a layer of muslin and 2 cm. of moderately moist compost soil, is exposed to optimum germination conditions for the spores for 10 days at 10° C. in a refrigerator.

The germination of the spores on the wheat grains, each of which is contaminated with about 100,000 spores, is subsequently determined microscopically. The smaller the number of spores which have germinated, the more effective is the active compound.

The active compounds, the concentrations of the active compounds in the dressing, the amounts of dressing used and the percentage spore germination can be seen from Table 9.

The following further examples are set forth to illustrate without limitation the method for producing the compounds according to the present invention.

EXAMPLE 10

(1) 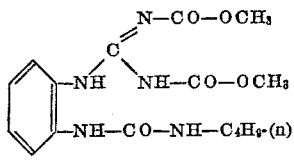

310 g. (1.5 moles) N-2-aminophenyl-N'-n-butylurea and 320 g. (1.52 moles) N,N'-bis-carbomethoxyisothiourea-S-methyl ether are boiled in 1 liter alcohol for 4 hours under reflux and then filtered hot. After cooling, suction filtration of precipitated matter is effected and the latter is washed with acetone. After drying, there are obtained 280 g. N-[2-(2'-butylureido)-phenyl]-N',N''-bis-(methoxycarbonyl)-guanidine having a melting point of 147 to 148° C. The yield is 50% of the theory.

TABLE 9.—SEED DRESSING TEST/BUNT OF WHEAT

| Active compound | Concentration of active compound in dressing in percent | Applied amount of dressing in g./kg. seed | Spore-germination in percent |
|---|---|---|---|
| Non-dressed | | | >10 |
| (C) CH₂—NH—CS—S\\Zn / CH₂—NH—CS—S (known) | 10 | 1 | 5 |
| (1) [structure with N—CO—OCH₃, NH—CO—OCH₃, NH—CO—NH—C₄H₉—(n)] | 30 | 1 | 0.05 |
| (2) [structure with N—CO—OC₂H₅, NH—CO—OC₂H₅, NH—CO—NH—C₄H₉—(n)] | 30 / 10 / 3 / 1 | 1 / 1 / 1 / 1 | 0.000 / 0.000 / 0.005 / 0.5 |
| (3) [structure with N—CO—OCH₃, NH—CO—OCH₃, NH—CO—NH—CH₃] | 30 / 10 / 3 | 1 / 1 / 1 | 0.005 / 0.005 / 0.05 |
| (8) [structure with N—CO—OCH₃, NH—CO—OCH₃, NH—CO—NH—C₁₂H₂₅] | 30 | 1 | 0.05 |
| (6) [structure with N—CO—OCH₃, NH—CO—OCH₃, NH—CO—NH—CH₂—CH₂—O—CH₃] | 30 | 1 | 0.05 |
| (7) [structure with N—CO—OCH₃, NH—CO—OCH₃, NH—CO—NH—N(CH₃)₂] | 30 / 10 | 1 / 1 | 0.005 / 0.05 |

In analogous manner, the following compounds are obtained:

| Example | Formula | Melting point (° C.) |
|---|---|---|
| (2) | ![structure with N=C(NH-phenyl-NH-CO-NH-C4H9-(n))(NH-CO-OC2H5), N-CO-OC2H5] | 149–151 |
| (3) | ![structure with N=C(NH-phenyl-NH-CO-NH-CH3)(NH-CO-OCH3), N-CO-OCH3] | ¹185 |
| (4) | ![structure with N=C(NH-phenyl-NH-CO-NH-C8H17)(NH-CO-OCH3), N-CO-OCH3] | ¹155 |
| (5) | ![structure with NH-C(=N-CO-OCH3)(NH-CO-OCH3), phenyl-NH-CO-NH-CH2-phenyl] | ¹155 |
| (6) | ![structure with NH-C(=N-CO-OCH3)(NH-CO-OCH3), phenyl-NH-CO-NH-CH2-CH2-O-CH3] | ¹152 |
| (7) | ![structure with NH-C(=N-CO-OCH3)(NH-CO-OCH3), phenyl-NH-CO-NH-N(CH3)2] | ¹160 |
| (8) | ![structure with NH-C(=N-CO-OCH3)(NH-CO-OCH3), phenyl-NH-CO-NH-C12H25] | 121–123 |

¹ With decomposition.

It will be realized by the artisan that all of the foregoing compounds contemplated by the present invention possess the desired strong fungicidal properties, with regard to a broad spectrum of activity, as well as a comparatively low toxicity toward warm-blooded creatures and a concomitantly low phytotoxicity, enabling such compounds to be used with correspondingly favorable compatibility with respect to warm-blooded creatures and plants for more effective control and/or elimination of fungi by application of such compounds to such fungi and/or their habitat.

It will be appreciated that the instant specification and examples are set forth by way of illustration and not limitation, and that various modifications and changes may be made without departing from the spirit and scope of the present invention.

What is claimed is:
1. A ureidophenylguanidine of the formula

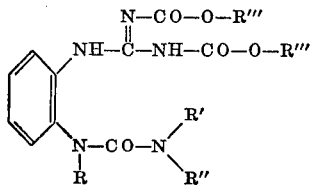

in which
R and R' each is hydrogen or lower alkyl,
R" is hydrogen, alkyl with 1 to 18 carbon atoms optionally substituted by lower alkoxy or benzyl, phenyl, p-tolyl, lower alkoxyphenyl, acetyl, benzoyl, or lower alkylamino, and
R''' is alkyl with up to 12 carbon atoms.

2. A compound according to claim 1 in which R and R' stand for hydrogen, methyl or ethyl; R" stands for hydrogen, alkyl with up to 12 carbon atoms, benzyl, phenyl, p-tolyl, or dimethylamino, and R''' stands for methyl, ethyl or propyl.

3. A compound according to claim 1 in which R and R' are hydrogen; R" stands for methyl, n-butyl, n-octyl, n-decyl, methoxyethyl, dimethylamino or benzyl; and R''' stands for methyl or ethyl.

4. Compound according to claim 1 wherein such compound is N-[2-(2'-butyl-ureido)-phenyl]-N',N"-bis-(methoxycarbonyl)-guanidine of the formula

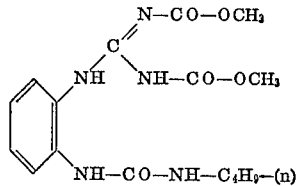

5. Compound according to claim 1 wherein such compound is N-[2-(2'-butyl-ureido)-phenyl]-N',N"-bis-(ethoxycarbonyl)-guanidine of the formula

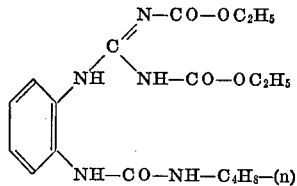

6. Compound according to claim 1 wherein such compound is N-[2-(2'-methyl-ureido)-phenyl] - N',N" - bis-(methoxycarbonyl)-guanidine of the formula

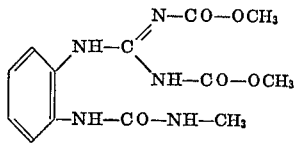

7. Compound according to claim 1 wherein such compound is N - [2 - (2' - octyl-ureido)-phenyl]-N',N"-bis-(methoxycarbonyl)-guanidine of the formula

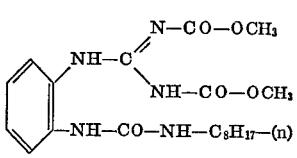

8. Compound according to claim 1 wherein such compound is N-[2-(2'-benzyl-ureido)-phenyl] - N',N'' - bis-(methoxycarbonyl)-guanidine

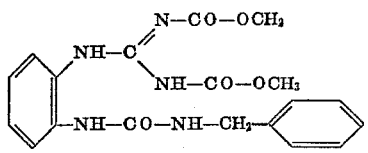

9. Compound according to claim 1 wherein such compound is N - [2 - (2' - methoxyethyl-ureido)-phenyl]-N',N''-bis-(methoxycarbonyl)-guanidine

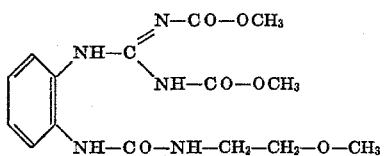

10. Compound according to claim 1 wherein such compound is N-[2-(2'-dimethylamino-ureido)-phenyl]-N',N''-bis-(methoxycarbonyl)-guanidine

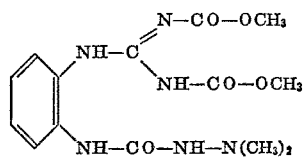

11. Compound according to claim 1 wherein such compound is N-[2-(2'-dodecyl-ureido)-phenyl]-N',N''-bis-(methoxycarbonyl)-guanidine

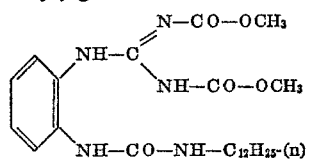

References Cited

UNITED STATES PATENTS 3,622,617  11/1971  Windel et al. _____ 260—471 C

LORRAINE A. WEINBERGER, Primary Examiner

L. A. THAXTON, Assistant Examiner

U.S. Cl. X.R.

260—326.3, 404.5, 465 D, 470; 424—274, 300

UNITED STATES PATENT OFFICE
CERTIFICATE OF CORRECTION

Patent No. 3,828,094  Dated August 6, 1974

Inventor(s) ARNO WIDDIG ET AL

It is certified that error appears in the above-identified patent and that said Letters Patent are hereby corrected as shown below:

Col. 5, line 4, correct spelling of "Cercospora".

Col. 8, Table 2, last column of Table, under heading "0.0060"

Compound (A), change "4" to -- 46 --;

Same column, Compound (1), change "4" to -- 40 --.

Col. 15, Table 6, under column headed "0.05", after "cur."

insert -- 25 --.

Col. 22, Claim 2, line 4, after "p-tolyl" insert -- p-methoxyphenyl, methoxyethyl, ethoxypropyl, cyanopentyl, acetyl --.

Col. 22, Claim 5, last line of the formula, change "$H_8$" to

-- $H_9$ --.

Signed and sealed this 28th day of January 1975.

(SEAL)
Attest:

McCOY M. GIBSON JR.  C. MARSHALL DANN
Attesting Officer  Commissioner of Patents